US011846343B2

(12) United States Patent
Glückler et al.

(10) Patent No.: US 11,846,343 B2
(45) Date of Patent: Dec. 19, 2023

(54) DRIVE AXLE OF AN ELECTRIC VEHICLE AND POWERSHIFTING METHOD

(71) Applicant: ZF Friedrichshafen AG, Friedrichshafen (DE)

(72) Inventors: Johannes Glückler, Friedrichshafen (DE); Stefan Spühler, Friedrichshafen (DE); Stefan Renner, Friedrichshafen (DE); Michael Trübenbach, Friedrichshafen (DE); Kai Bornträger, Langenargen (DE); Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/764,824

(22) PCT Filed: Sep. 24, 2020

(86) PCT No.: PCT/EP2020/076679

§ 371 (c)(1),
(2) Date: Mar. 29, 2022

(87) PCT Pub. No.: WO2021/063789

PCT Pub. Date: Apr. 8, 2021

(65) Prior Publication Data

US 2022/0364631 A1 Nov. 17, 2022

(30) Foreign Application Priority Data

Sep. 30, 2019 (DE) ..................... 10 2019 214 986.3

(51) Int. Cl.
*F16H 37/08* (2006.01)
*B60K 1/02* (2006.01)
(Continued)

(52) U.S. Cl.
CPC ............. *F16H 37/082* (2013.01); *B60K 1/02* (2013.01); *B60K 17/046* (2013.01); *B60K 17/08* (2013.01);
(Continued)

(58) Field of Classification Search
CPC ........... F16H 37/082; F16H 2200/0021; F16H 2200/0034; F16H 2200/0039;
(Continued)

(56) References Cited

U.S. PATENT DOCUMENTS 2,037,126 A 4/1936 Ford
5,879,265 A 3/1999 Bek
(Continued)

FOREIGN PATENT DOCUMENTS

CN 206749500 U * 12/2017
CN 107985068 A * 5/2018
(Continued)

OTHER PUBLICATIONS

German Patent Office, Search Report issued in German Patent Application No. 10 2019 214 986.3 (dated May 5, 2020).
(Continued)

*Primary Examiner* — Justin Holmes
(74) *Attorney, Agent, or Firm* — Finch & Maloney PLLC

(57) ABSTRACT

A drive axle of an electric vehicle has first and a second drive wheels (R1, R2) with wheel axles (a1, a2), a first electric machine (EM1) and a second electric machine (EM2) with a common rotation axis (m), a transmission (G3) with a transmission input shaft (EW) and a transmission output shaft (AW), and an axle differential (DI) with a differential input (DIK) and two differential output shafts (3*a*, 3*b*). The first electric machine (EM1) is connected to the transmission input shaft (EW) and the transmission output shaft (AW) is connected to the differential input (DIK). The second elec-
(Continued)

tric machine (EM2) can be connected as an additional drive when necessary.

19 Claims, 6 Drawing Sheets

(51) Int. Cl.
*B60K 17/04* (2006.01)
*B60K 17/08* (2006.01)
*B60K 17/16* (2006.01)

(52) U.S. Cl.
CPC .... *B60K 17/165* (2013.01); *F16H 2200/0021* (2013.01); *F16H 2200/0034* (2013.01); *F16H 2200/0039* (2013.01); *F16H 2200/2007* (2013.01); *F16H 2200/2012* (2013.01); *F16H 2200/2094* (2013.01)

(58) Field of Classification Search
CPC ..... F16H 2200/2007; F16H 2200/2012; F16H 2200/2094; F16H 61/686; F16H 2061/0422; F16H 2061/0433; F16H 3/78; F16H 61/0403; F16H 2200/2035; F16H 2200/2038; F16H 2200/2064; F16H 2200/2097; F16H 3/66; B60K 1/02; B60K 17/046; B60K 17/08; B60K 17/165; B60K 17/043; B60K 17/16; B60K 17/22; B60Y 2200/22; B60Y 2200/221; B60Y 2200/41; B60Y 2200/415; B60Y 2400/73; B60Y 2200/91; B60Y 2400/60; B60Y 2400/79; B60Y 2400/80
See application file for complete search history.

(56) References Cited

U.S. PATENT DOCUMENTS

| | | | |
|---|---|---|---|
| 6,557,656 | B2 | 5/2003 | Haniu et al. |
| 7,220,203 | B2 | 5/2007 | Holmes et al. |
| 7,363,996 | B2 | 4/2008 | Kamada et al. |
| 7,387,585 | B2 | 6/2008 | Bucknor et al. |
| 7,479,081 | B2 | 1/2009 | Holmes |
| 7,594,869 | B2 | 9/2009 | Holmes |
| 7,695,387 | B2 | 4/2010 | Oba |
| 7,967,711 | B2 | 6/2011 | Conlon et al. |
| 8,091,661 | B2 | 1/2012 | Oba et al. |
| 8,512,187 | B2 | 8/2013 | Puiu et al. |
| 8,528,676 | B2 | 9/2013 | Endo et al. |
| 9,566,857 | B1 | 2/2017 | Pritchard et al. |
| 10,968,983 | B2 | 4/2021 | Hara et al. |
| 11,002,350 | B2 | 5/2021 | Waltz |
| 11,124,064 | B2 | 9/2021 | Kaltenbach et al. |
| 11,156,280 | B2 | 10/2021 | Kurth |
| 11,364,784 | B2 | 6/2022 | Kaltenbach et al. |
| 11,365,785 | B2 | 6/2022 | Kumar et al. |
| 11,472,277 | B2 | 10/2022 | Gluckler et al. |
| 2006/0025263 | A1 | 2/2006 | Sowul et al. |
| 2007/0219036 | A1 | 9/2007 | Bucknor et al. |
| 2011/0259657 | A1 | 10/2011 | Fuechtner |
| 2020/0331336 | A1 | 10/2020 | Kaltenbach et al. |
| 2021/0188066 | A1 | 6/2021 | McGrew et al. |
| 2021/0372506 | A1 | 12/2021 | McGrew, Jr. et al. |
| 2022/0186468 | A1 | 6/2022 | Glöckner et al. |
| 2022/0364631 | A1 | 11/2022 | Glückler |
| 2022/0409500 | A1 | 12/2022 | Lechner |

FOREIGN PATENT DOCUMENTS

| | | | | |
|---|---|---|---|---|
| CN | 208630340 U | 3/2019 | |
| DE | 1505723 | 7/1970 | |
| DE | 102011088647 A1 * | 6/2013 | ............ B60K 6/387 |
| DE | 10 2012 204 717 A1 | 9/2013 | |
| DE | 10 2015 215 393 A1 | 9/2016 | |
| DE | 10 2017 218 513 A1 | 4/2019 | |
| DE | 10 2018 001 508 B3 | 5/2019 | |
| DE | 10 2017 011 387 A1 | 6/2019 | |
| DE | 10 2019 202 994 A1 | 9/2020 | |
| DE | 10 2020 203 669 A1 | 9/2021 | |
| DE | 10 2020 215 124 A1 | 6/2022 | |
| WO | 2019/115204 A1 | 6/2019 | |
| WO | WO-2020030212 A1 * | 2/2020 | .............. B60K 1/00 |
| WO | 2021/063789 A1 | 4/2021 | |

OTHER PUBLICATIONS

European Patent Office, International Search Report issued in PCT Application No. PCT/EP2020/076679 (dated Dec. 11, 2020).
European Patent Office, Written Opinion issued in PCT Application No. PCT/EP2020/076679 (dated Dec. 11, 2020).
United States Patent and Trademark Office, Office Action issued in U.S. Appl. No. 18/192,018 (dated Sep. 25, 2023).
German Patent Office, Search Report issued in German patent application No. 10 2022 209 050.0 (dated Jul. 24, 2023).
German Patent Office, Search Report issued in German patent application No. 10 2022 203 097.4 (dated Jul. 11, 2022).
German Patent Office, Search Report issued in German patent application No. 10 2022 209 051.9 (dated Mar. 29, 2023).
German Patent Office, Search Report issued in German patent application No. 10 2022 209 052.7 (dated Mar. 15, 2023).

* cited by examiner

DRIVE AXLE OF AN ELECTRIC VEHICLE AND POWERSHIFTING METHOD

RELATED APPLICATIONS

This application claims the benefit under 35 U.S.C. § 371 as a U.S. National Application of application no. PCT/EP2020/076679, filed on 24 Sep. 2020, which claims benefit of German Patent Application no. 10 2019 214 986.3 filed 30 Sep. 2019, the contents of which are hereby incorporated herein by reference in their entireties.

FIELD OF THE DISCLOSURE

The invention relates to a drive axle of an electric vehicle, which comprises a first and a second drive wheel with wheel axles, a first and a second electric machine with a common rotation axis, a change-speed transmission with a transmission input shaft and a transmission output shaft, and an axle differential. The invention further relates to a method for carrying out gearshifts under load (powershifting method) by means of a shifting mechanism and a coupling mechanism of the transmission.

BACKGROUND

In a previous application with file number 10 2019 202 994.9 a drive unit for an electric vehicle with an electric machine and a two-gear or three-gear change-speed transmission is disclosed, wherein a shifting mechanism with three or two shifting elements is provided for the engagement of three or two gears. By omitting a shifting element, the three-gear transmission can be used as a two-gear transmission. The transmission comprises two planetary gearsets coupled to one another, wherein the first planetary gearset is driven by the electric machine by way of its sun shaft (the transmission input shaft), while the ring gear shaft of the first planetary gearset is held fixed. The first planetary gearset is coupled by way of its web shaft to the ring gear shaft of the second planetary gearset. The web shaft of the second planetary gearset forms the transmission output shaft. The three shifting elements, or two shifting elements, are integrated in a sliding sleeve which can move axially on the sun shaft of the second planetary gearset, such that for the three-gear transmission a total of five positions are available, namely three shifting positions and two neutral positions.

In the noted previous application, a drive axle with drive wheels is also disclosed, in which the drive unit serves as the drive input and drives an axle differential arranged between the drive wheels. The transmission output shaft of the drive unit is thus connected to the differential input, namely the differential cage. With this drive axle, which comprises only one electric drive machine and only one transmission and an axle differential, powershifts are not possible. Owing to the shifting elements configured as claws, the gearshifts take place with traction force interruption. The aforesaid previous application is fully incorporated in the disclosure content of the present application and will be referred to as the 'previous application' for short.

SUMMARY

Starting from the previous application, the purpose of the present invention is to develop further potentials using the previously described change-speed transmission or gearset.

According to the invention, with the drive axle mentioned to begin with, with two electric machines and a transmission and an axle differential, it is provided that the first electric machine drives the axle differential by way of the transmission and the second electric machine can be connected when needed. The advantage here is that the second electric machine can be used on the one hand to reinforce the drive power, i.e. to assist the first electric machine, and/or on the other hand to support the traction force during shifting processes. Owing to the design of the shifting elements as claws, without the second electric machine a traction force interruption would take place. When the second electric machine is connected, during the shifting process power flows from the second electric machine into the transmission so that no traction force interruption takes place, i.e. powershifts are possible. It is also advantageous that although the drive axle has two electric machines, only one transmission is needed.

According to an advantageous design, the transmission is in the form of a three-gear transmission with three shifting elements and two planetary gearsets coupled to one another, which form a gearset. This gearset corresponds to that disclosed in the previous application, to which reference should be made.

According to further preferred embodiments, the second sun shaft is coupled to the housing to engage the first gear. To engage the second gear the second planetary gearset is blocked, to do which there are basically three variants of the coupling in each case of two of the three shafts of the second planetary gearset. To engage the third gear, the sun shafts of the first and the second planetary gearsets are coupled to one another. The shifts are carried out, respectively, by means of a first shifting element (first gear), a second shifting element (second gear) and a third shifting element (third gear). This, too, corresponds with the referenced previous application.

In another preferred embodiment the transmission is in the form of a two-gear transmission, wherein the first gear is engaged by means of a first shifting element and the second gear by means of a third shifting element. Thus, compared with the three-gear transmission, in the two-gear transmission only the second shifting element has been omitted. The two-gear transmission too corresponds with the referenced previous application.

According to a further preferred embodiment, the shifting elements are unsynchronized claw-type shifting elements, as already disclosed in the previous application.

In a further preferred embodiment, the first electric machine can be decoupled, for which purpose the shifting mechanism has at least one neutral position. This decoupling enables the electric vehicle to coast freely without the resistance attributable to the co-rotating electric machine.

According to a further preferred embodiment, the three shifting elements are integrated in a sliding sleeve, this sliding sleeve being arranged and able to be displaced on a shaft, namely the sun shaft of the second planetary gearset. In that way, all the shift and neutral positions (five positions) can be selected with a sliding sleeve and actuated by means of only one actuator. This, too, corresponds with the disclosure of the previous application.

In a further preferred embodiment, a coupling mechanism with two coupling positions and one neutral position is associated with the second electric machine. This enables the power of the second electric machine to be supplied to the transmission by way of two different paths, according to need.

According to a further preferred embodiment, in a first coupling position the second electric machine is connected directly to the transmission input shaft. In that way the powers or torques of the two electric machines are added together. Since with this coupling the two machines have the same rotation speed, if the electric machines are identical the chive power delivered to the differential is doubled.

In a further preferred embodiment, in a second coupling position the second electric machine is coupled to the sun shaft of the second planetary gearset. Then the power of the second electric machine flows to the transmission along another path, whereby superposed operation is obtained. In this coupling position the traction force can be supported during shifts in the transmission. When during a shifting process a traction force interruption takes place while passing through the neutral position, the second electric machine provides support by way of the second sun shaft so that no traction force interruption takes place at the transmission output shaft. This enables powershifts to be carried out.

According to a further preferred embodiment, the coupling mechanism has a neutral position in which the second electric machine can be decoupled so that it does not co-rotate. This avoids drag losses.

In a further preferred embodiment, the sliding sleeve of the shifting mechanism has an access point which enables a mechanical connection to be formed between the sun shaft of the second planetary gearset and the coupling mechanism. In that way the second sun shaft can be connected to the coupling mechanism and the second electric machine can deliver a torque to the transmission by way of the coupling mechanism.

In another preferred embodiment, the wheel axles are arranged coaxially or axis-parallel relative to the rotation axis of the two electric machines. In the coaxial design a compact arrangement of the transmission and shifting elements in the area close to the axis is obtained, wherein the transmission and also the differential and the shifting elements can be arranged radially within the electric machines, i.e. within their rotors.

According to a further preferred embodiment, fixed gear ratios are arranged between the differential output shafts and the drive wheels, whereby the overall gear ratio between the electric machine and the drive wheels is increased further into the slow range. The gear ratios can take various forms, as already disclosed in the referenced previous application.

In a further preferred embodiment, the drive axle is in the form of a portal axle, wherein relative to the differential output shafts and relative to the rotation axis of the electric machines, the wheel axles are axially offset. In that way a larger ground clearance for the electric vehicle is achieved. The portal axle too, which can be made with different gear ratios, corresponds with the previous application.

According to a further preferred embodiment the rotation axis of the electric machines is arranged perpendicularly to the wheel axles, i.e. in the longitudinal direction of the electric vehicle. In that way, the axle differential is driven by means of a bevel gear of the transmission output shaft. This drive arrangement is known as a central drive, wherein the electric machines and the transmission are arranged outside the vehicle axle, which only comprises the axle differential and the drive wheels.

In accordance with a further aspect of the invention, in a method for carrying out gearshifts under load, i.e. the so-termed powershifting process, it is provided that the first electric machine is operated as the main drive machine and the second electric machine can be called into play in order to support the traction force during gearshift processes. This gives the advantage of a powershift, i.e. a shift without traction force interruption.

In a preferred variant of the method, to prepare for a gearshift in the transmission the second sun shaft is coupled to the second electric machine. In that way additional power flows into the transmission and the second electric machine provides support during the gearshift process, particularly when passing through the neutral position. Accordingly, no traction force interruption takes place.

BRIEF DESCRIPTION OF THE DRAWINGS

Example embodiments of the invention are illustrated in the drawing and will be described in greater detail below, so that from the description and/or the drawing further features and/or advantages can emerge. The drawings show.

DETAILED DESCRIPTION

Figure 1:
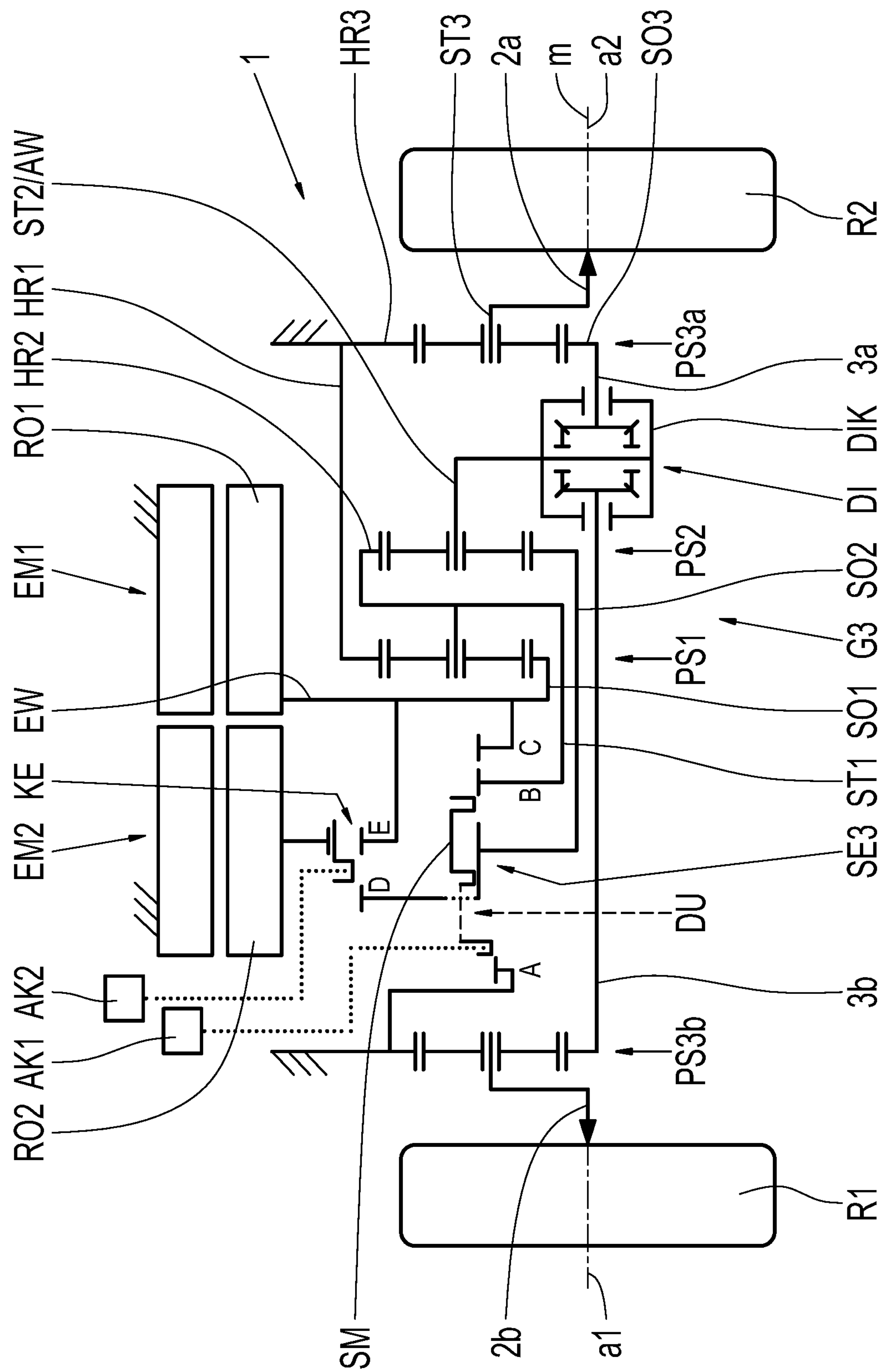
FIG. 1: A drive axle of an electric vehicle according to the invention, with two electric machines and a three-gear change-speed transmission.

FIG. 1 shows, as a first example embodiment of the invention, a drive axle 1 which comprises two drive wheels R1, R2 with wheel axles a1 a2, a first electric machine EM1 with a first rotor RO1, a second electric machine EM2 with a second rotor RO2, and a three-gear change-speed transmission G3, Associated with the transmission G3 is a shifting mechanism SE3 with a first shifting element A, a second shifting element B and a third shifting element C. Between the two drive wheels R1, R2 there is arranged a differential DI with a differential input in the form of a differential cage DIK and two differential output shafts 3*a*, 3*b*.

The three-gear change-speed transmission G3, called just the transmission G3 for short in what follows, comprises two planetary gearsets coupled to one another, namely a first planetary gearset PS1 with a first sun shaft SO1, a first web shaft ST1 and a first ring gear shaft HR1 fixed to the housing, and a second planetary gearset PS2 with a second sun shaft SO2, a second web shaft ST2 and a second ring gear shaft HR2, which is connected fixed to the first web shaft ST1 and forms a coupling shaft between the two planetary gearsets PS1 and PS2. The first sun shaft SO1 is connected fast to the first rotor RO1 and thus forms the transmission input shaft EW of the transmission G3. The second web shaft ST2 forms the transmission output shaft AW, which drives the differential DI, i.e. it is connected fast to the differential cage DIK. The two planetary gearsets PS1, PS2 form a gearset that corresponds with the gearset disclosed in the previous application. Between the differential DI and the drive wheels R1, R2 fixed gear ratios are arranged in each case, here depicted as a third planetary gearset PS3*a* arranged on the right and a third planetary gearset PS3*b* arranged on the left, which are configured mirror-symmetrically. The differential DI has two differential output shafts 3*a*, 3*b* which drive the sun shafts SO3 of the planetary gearsets PS3*a*, PS3*b*. The ring gear shafts HR3 are in each case held fixed; the drive output takes place in each case by way of the web shaft ST3, which as drive output shafts 2*a*, 2*b*, drive the drive wheels R1, R2.

With the shifting mechanism SE3 three gears can be engaged. To engage the first gear, the second sun shaft SO2 is coupled, i.e. held fast by means of the first shifting element A, to the housing, represented by hatching. Thus, the two planetary gearsets PS1, PS2 run with fixed gear ratios in each case, which when multiplied with one another, determine the gear ratio of the first gear.

The second shifting element B, by means of which the second gear is engaged, blocks the second planetary gearset PS2 in that basically two of the three shafts SO2, ST2, HR2 can be coupled to one another. In the example embodiment illustrated, the second sun shaft SO2 is coupled to the second ring gear shaft HR2. Owing to the blocking, the second planetary gearset PS2 rotates as a block, i.e. with a gear ratio of 1:1 so that the gear ratio of the second gear is determined by the fixed gear ratio of the first planetary gearset PS1.

The third shifting element C, by means of which the third gear is engaged, connects the second sun shaft SO2 to the first sun shaft SO1. This produces a dual coupling of the first and second planetary gearsets PS1, PS2, whereby a superimposed operation of the first and second planetary gearsets PS1, PS2 with a lower gear ratio for the third gear is obtained.

The shifting elements A, B and C are preferably in the form of unsynchronized claws, although basically frictional, synchronized shifting elements can also be used for the shifting functions described. Between the three shift positions in which either the shifting element A, or the shifting element B or the shifting element C is closed, the transmission G3 also has two neutral positions in which the first electric machine EM1 can be decoupled from the transmission G3. This makes possible a so-termed coasting operation, i.e. free rolling of the electric vehicle without losses due to the co-rotation of the first electric machine EM1. As can also be seen from the figure, the rotor RO1 of the first electric machine EM1 has a cylindrical hollow space in which the two planetary gearsets PS1, PS2 and partially also the differential DI can be accommodated in a space-saving manner; in particular, in that way structural space in the axial direction is saved.

As stated above, the second sun shaft SO2 of the second planetary gearset PS2 participates in all the shift positions—and accordingly all the shifting elements, i.e. the first, second and third shifting elements A, B, C, can be integrated in a single sliding sleeve SM which, in all the shift positions, is connected to the second sun shaft SO2 in a rotationally fixed manner. The sliding sleeve SM is actuated by a single actuator AK1. Since the gears one to three can be engaged one after another by displacing the sliding sleeve SM in one direction, respectively across the neutral positions, the possibility exists of synchronizing the shifting elements.

The second electric machine EM2 can be connected or decoupled by means of a coupling mechanism KE. The said coupling mechanism KE comprises a first coupling element D and a second coupling element E. By means of the second coupling element E, the second electric machine EM2 is connected via its rotor RO2 to the transmission input shaft EW of the transmission. By virtue of this coupling of the two rotors RO1, RO2, the two electric machines EM1, EM2 rotate at the same rotation speed. Thus, the second electric machine EM2 boosts the drive power which, if the electric machines EM1 and EM2 are identical, can be doubled.

By means of the first coupling element D the second electric machine EM2 is connected to the second sun shaft SO2, this coupling connection being enabled by an access point DU in the sliding sleeve SM of the shifting mechanism SE3. The first coupling element D can thus access the sun shaft SO2 of the second planetary gearset PS2 through the sliding sleeve SM. In that way the power of the second electric machine EM2 flows along another path in the transmission G3 so that the power flows of the two electric machines EM1, EM2 are superimposed.

According to the invention, with the first coupling position D of the coupling mechanism KE support of the traction force is achieved, whereby powershifts by the transmission G3 are made possible. For example, if during a gearshift, i.e. the engagement of a new gear, the power flow from the first electric machine EM1 is interrupted, then a torque is supplied to the sun shaft SO2 of the second planetary gearset PS2 by the second electric machine EM2, which torque causes the traction force in the drive output shaft AW or the second web shaft ST2 to be maintained. This shifting without interruption of the traction force is also known as a powershifting process, which is described in greater detail in what follows.

In the powershifting process according to the invention the first electric machine EM1 acts as the main drive machine, since it is connected fixed to the transmission G3 by way of the transmission input shaft EW. To support the gearshifts, the second electric machine EM2 is connected for preparatory purposes to the second sun shaft SO2.

Below, the gearshift process from the first to the second gear is described, for which the first shifting element A of the shifting mechanism SE3 is first opened and the second shifting element B is then closed. Starting from the situation that the second electric machine EM2 was previously connected to the transmission input shaft EW, i.e. the two electric machines EM1, EM2 are both operating in driving mode, first of all the load on the second electric machine EM2 is reduced, i.e, the second coupling element E of the coupling mechanism KE is opened and the first coupling element D is synchronized with the second electric machine EM2, i.e. in this case braked down to zero rotation speed. Then the first coupling element D is closed. The second electric machine EM2 is thereby connected to the second sun shaft SO2. Thereafter a torque is built up by the second electric machine EM2, so that the first shifting element A, which acts as a brake, is relieved of load. If the second electric machine EM2 cannot supply enough torque, the torque of the first electric machine EM1 is correspondingly reduced. Then the first shifting element A is opened. The torques of the first and second electric machines EM1, EM2 are controlled or regulated in such manner that the rotation speed of the second electric machine EM2 is increased and the rotation speed of the first electric machine EM1 is reduced. For that purpose, preferably the torque of the second electric machine EM2—if possible—is increased somewhat and at the same time the torque of the first electric machine EM1 is somewhat reduced. The target rotation speed of the second sun shaft SO2, which corresponds to the rotation speed of the second electric machine EM2, is the rotation speed of the second ring gear shaft HR2 so that the second shifting element B becomes synchronous. As soon as the second shifting element B is synchronous, it can be closed. The torques of the first and second electric machines EM1, EM2 can now be divided in any desired way since a fixed gear, namely the second gear, is engaged. If needs be the second electric machine EM2 can be decoupled from the second sun shaft SO2. If the full drive power is required, the second electric machine EM2 can also be connected to the transmission input shaft EW or the first sun shaft SO1.

The shifting mechanism SE3 or its sliding sleeve SM is actuated by a first actuator. AKE while the coupling mechanism KE is actuated by a second actuator AK2. The common rotation axis m of the two electric machines EM1, EM2 coincides with the two wheel axles a1, a2. The planetary gearsets PS1, PS2, PS3*a*, PS3*b*, of which in each case only the top half is shown, are arranged rotationally symmetrically relative to the rotation axis in.

The powershifting process when shifting from the second to the third gear, wherein the second shifting element B is opened and the third shifting element C is closed, takes place analogously to the shifting process from the first to the second gear as described above. Downshifts take place analogously but in the reverse direction of the rotation speeds in the first and second electric machines.

Figure 2:
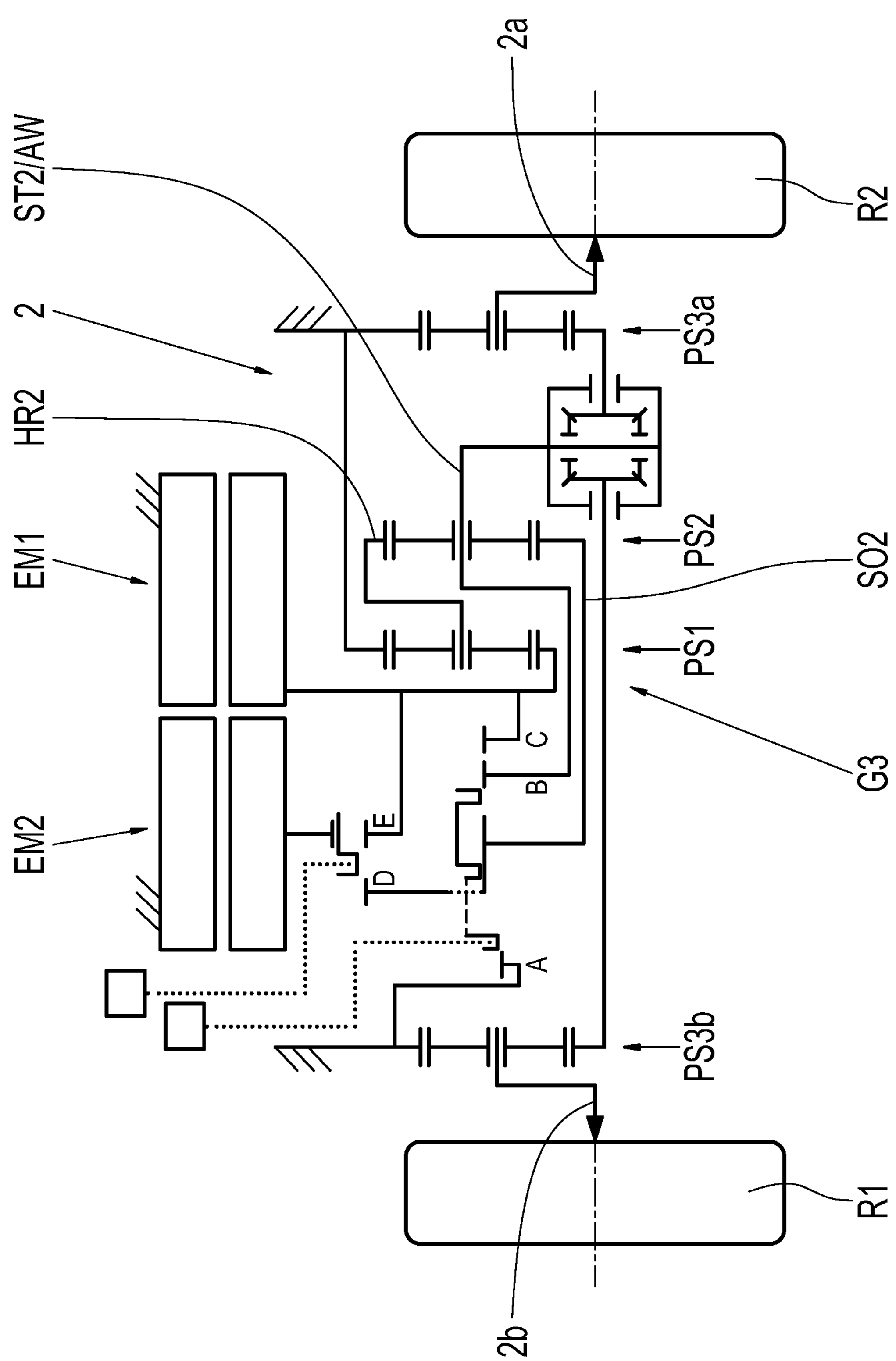
FIG. 2: The drive axle of FIG. 1 with a shifting variant.

FIG. 2 shows, as a further example embodiment of the invention, a drive axle 2 which essentially corresponds particularly in its functional components to the drive axle 1 in FIG. 1; for the same components, the same indexes are used as in FIG. 1. The coupling of the shafts of the second planetary gearset in the shift position B is different from that in FIG. 1. FIG. 2 shows a blocking variant in which the sun shaft SO2 and the web shaft ST2, which is at the same time the transmission output shaft AW of the transmission G3, are connected with one another. Thus, the second planetary gearset PS2 rotates as a block, i.e. with a gear ratio of 1:1. To that extent this blocking variant corresponds functionally to the blocking shown in FIG. 1. Basically, for the second planetary gearset PS2 there is a further blocking variant in which the web shaft ST2 is connected to the ring gear shaft HR2. This blocking variant, in which the sun shaft SO2 plays no part, is in this case less preferable since it cannot be produced with a single sliding sleeve. SM connected to the sun shaft SO2.

Figure 3:
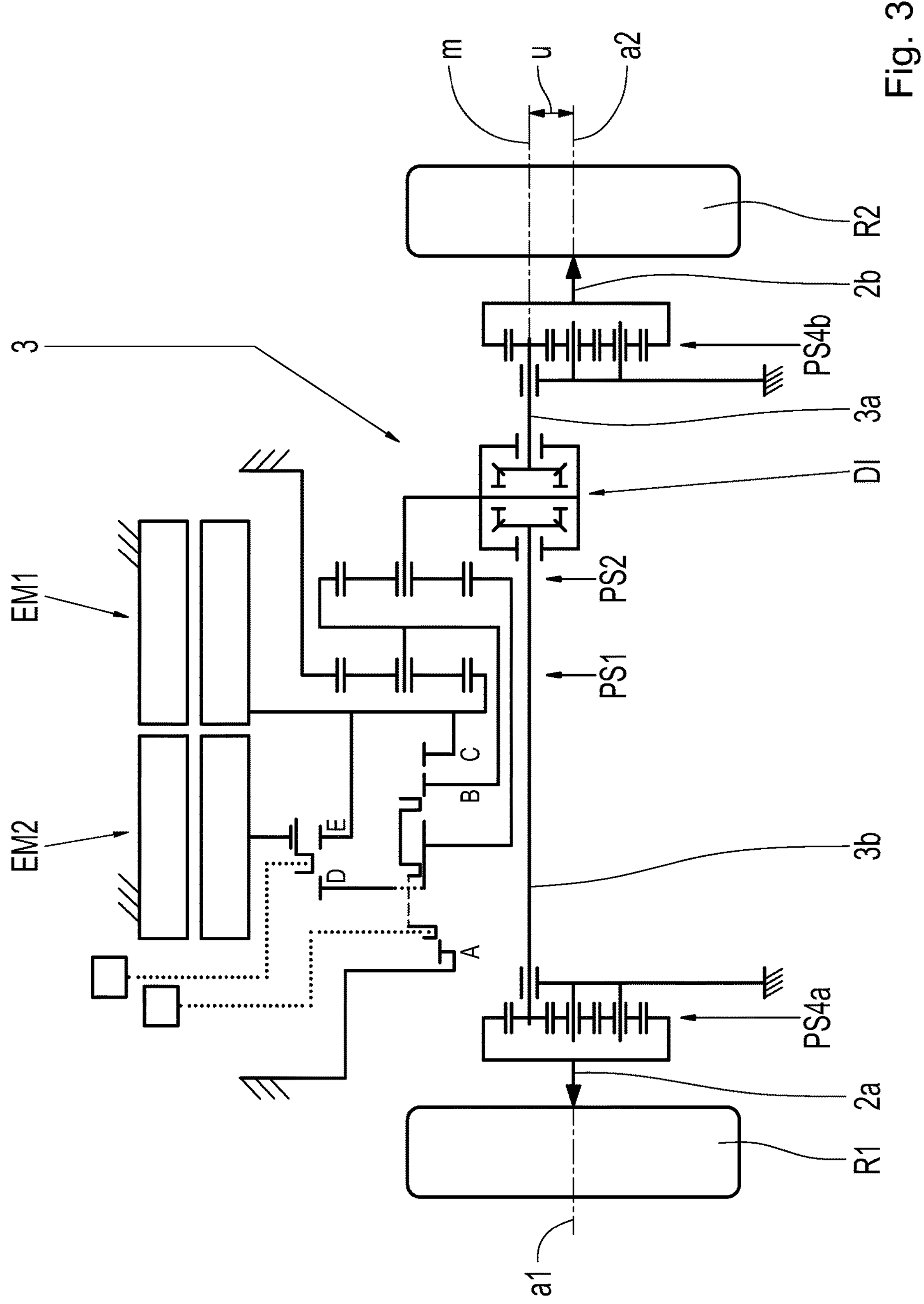
FIG. 3: The drive axle of FIG. 1, but in the form of a portal axle, in a first embodiment.

FIG. 3, as a further example embodiment of the invention, shows a drive axle 3 which corresponds essentially to the drive axle 1 according to FIG. 1, but with the difference that the drive axle 3 is in the form of a portal axle, i.e. the wheel axles a1, a2 are offset by a distance u relative to the rotation axis m. This results in greater ground clearance. The axle offset u is produced by virtue of two mirror-symmetrically formed gear ratio steps PS4*a*, PS4*b* arranged in the area of the drive wheels R1, R2, which steps are in the form of planetary gearsets in which, in each case, the web is held fixed. Drive input takes place from the differential output shafts 3*a*, 3*b* via a planetary gearwheel, whereas the drive output takes place via the sun shaft to the drive output shafts 2*a*, 2*b*, coaxially with the wheel axles a1, a2. The planetary gearsets PS4*a*, PS4*b* correspond to the planetary gearset 30 according to FIG. 3 of the previous application and the associated description on page 11, continued on page 12, first paragraph thereof, to which reference should be made as a supplement.

Figure 4:
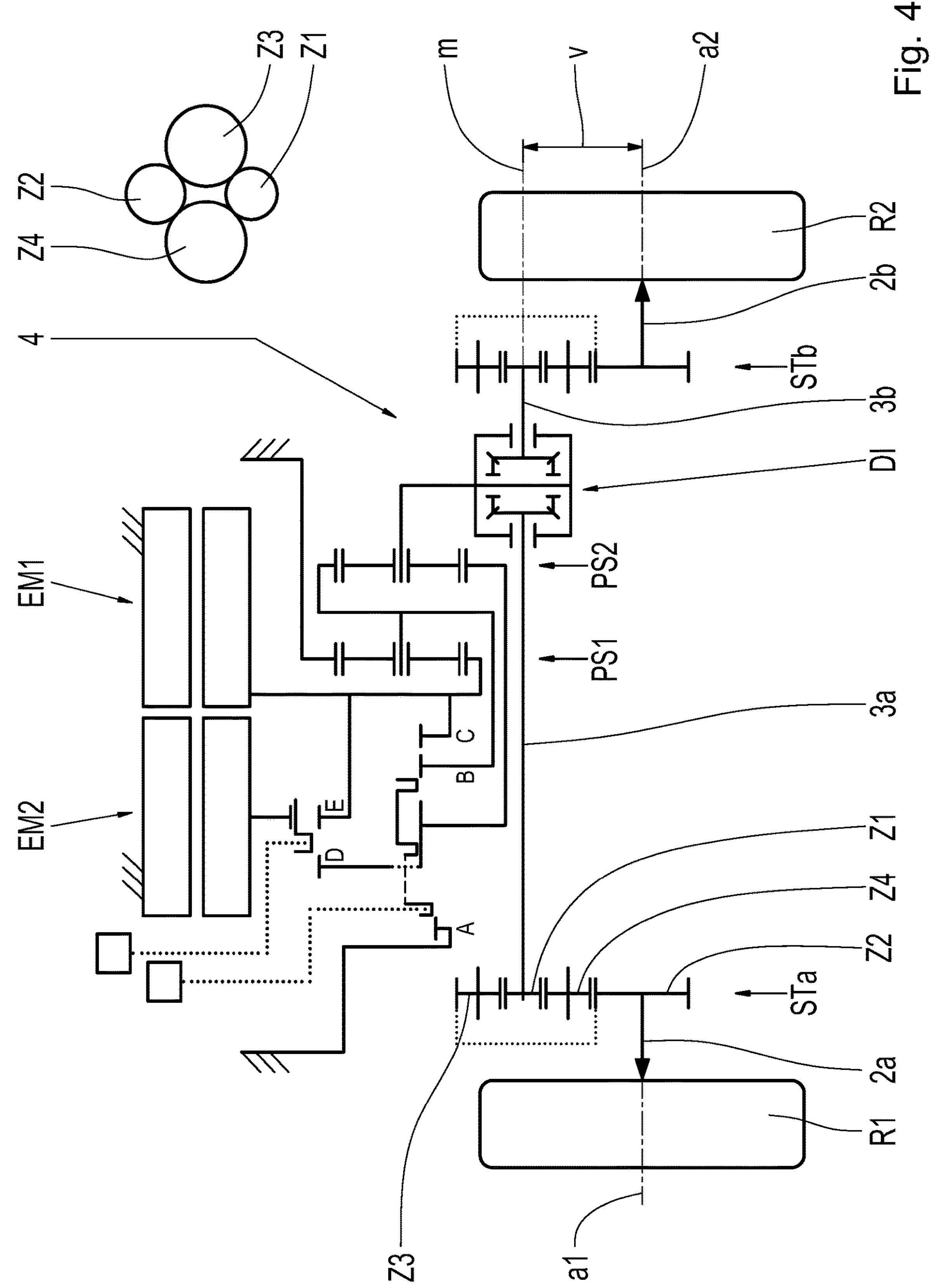
FIG. 4: The drive axle of FIG. 1, but in the form of a portal axle, in a second embodiment.

FIG. 4 shows, as a further example embodiment of the invention, a drive axle 4, which is again in the form of a portal axle but with modified, wheel-adjacent constant gear ratio steps which are in this case in the form of spur gear stationary transmissions STa, STb, with an axle offset v between the differential output shafts 3*a*, 3*b* and the drive output shafts 2*a*, 2*b*. The stationary transmission STa comprises a drive input gearwheel Z1 arranged rotationally fixed on the drive input shaft 3*a*, a drive output gearwheel Z2 arranged on the drive output shaft 2*a* and two intermediate wheels Z3. Z4 each of which meshes with the drive input gearwheel Z1 and the drive output gearwheel Z2. A wheel diagram for the arrangement of the gearwheels Z1, Z2, Z3 and Z4 in a radial plane is shown in the figure at the top, on the right. By virtue of the intermediate wheels Z3 and Z4, on the one hand a power split and on the other hand a relatively larger axial offset v, which is larger than the axial offset u of the fourth planetary gearset PS4*a*, PS4*b* in FIG. 3, is obtained.

Figure 5:
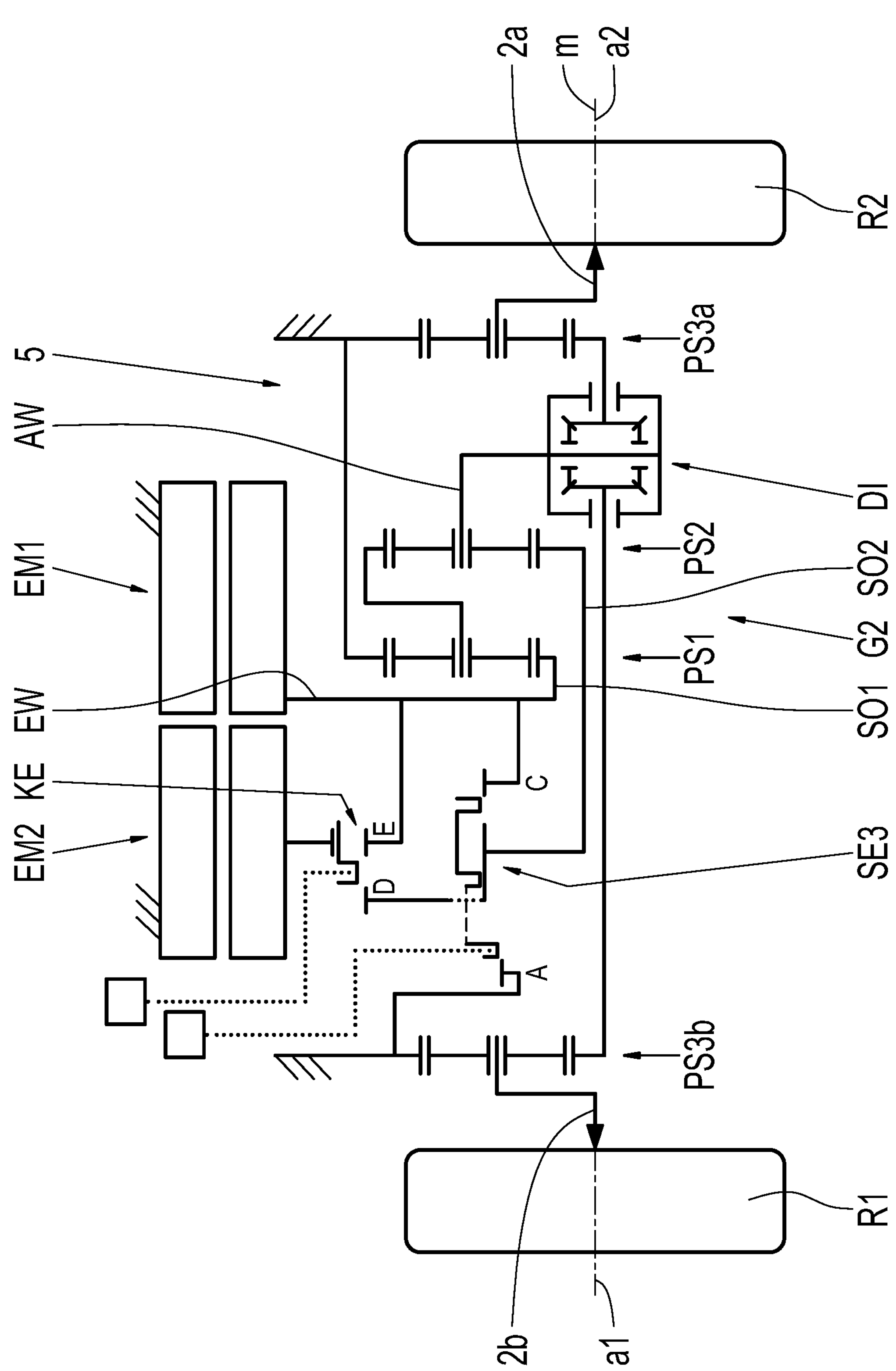
FIG. 5: A drive axle with a two-gear transmission.

FIG. 5 shows, as a further example embodiment of the invention, a drive axle 5 in which the transmission is in the form of a two-gear transmission G2, and which comprises a shifting mechanism SE2 with only two shifting elements, the first shifting element A and the third shifting element C. Thus, compared with the three-gear transmission G3 according to FIG. 1, in the two-gear transmission G2 the second shifting element B has been omitted. The first and second gears are engaged by means of the two shifting elements A and C. When the shifting element A is closed the second sun shaft SO2 is connected to the housing, so that both planetary gearsets PS1 and PS2 rotate with a fixed gear ratio. The fixed gear ratios connected one behind the other determine the gear ratio of the first gear. The second gear is formed by closing the shifting element C, whereby the two sun shafts SO1, SO2 are coupled to one another—giving superimposed operation of the two planetary gearsets PS1, PS2, from which the gear ratio for the second gear results. The gear interval or gear spread between the first and second gears in the two-gear transmission is thus the same as between the first and third gears in the three-gear transmission G3 (FIG. 1). The two-gear transmission G2 has a shorter shifting path for the sliding sleeve SM, since there are only three shift positions, namely "A", Neutral and "C". The transmission output shaft AW of the two-gear transmission G2, i.e. the second web shaft ST2, is connected directly to the differential cage DIK of the differential DI. The variant for a two-gear transmission G2 shown here is basically compatible with the three-gear transmission G3 for all the above example embodiments, i.e. if necessary, the three-gear transmission G3 can be replaced by the two-gear transmission G2 since the second shifting element B is omitted.

Figure 6:
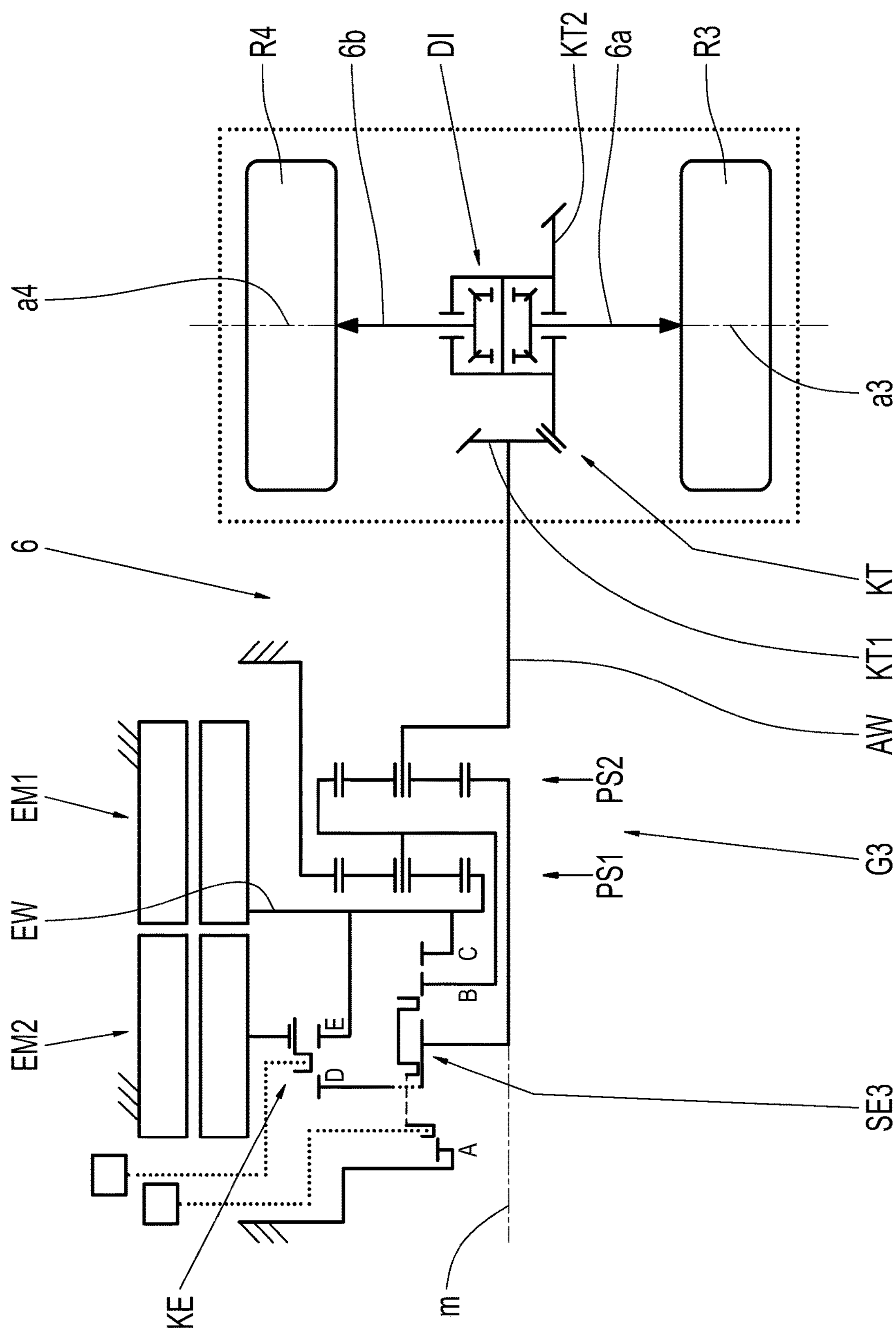
FIG. 6: A chive arrangement for an electric vehicle, with central drive.

FIG. 6 shows as a further example embodiment of the invention a drive arrangement 6, which is in the form of a so-termed central drive. The difference compared with the previous example embodiments is that the electric machines EM1, EM2 and the transmission G3 are not arranged in the area of the wheel axles a3, a4 but in a "central" position in the electric vehicle. The first electric machine EM1 with the transmission G3 and the shifting mechanism SE3 and the second electric machine EM2 with the coupling mechanism KE, form a drive unit with a rotation and symmetry axis m, which is arranged perpendicularly to the wheels axles a3, a4 of the drive wheels R3, R4. Between the drive wheels R3 and R4 is arranged a differential DI with differential output shafts 6*a*, 6*b* which drive the drive wheels R3 and R4. The differential DI is driven by the transmission output shaft AW of the transmission G3 by way of a bevel drive KT. For that purpose, a bevel gear pinion KT1 which is fixed on the transmission output shaft AW meshes with a crown wheel KT2, which is connected fixed to the differential cage of the differential DI.

The three-gear transmission G3 shown in FIG. 6 can be replaced by the two-gear transmission G2 shown in FIG. 5.

INDEXES

1 Drive axle
2 Drive axle
2*a* Drive output shaft on the right
2*b* Drive output shaft on the left
3 Drive input shaft
3*a* Differential output shaft on the right
3*b* Differential output shaft on the left

4 Drive axle
5 Drive axle
6 Drive arrangement
**6*a*** Differential output shaft
**6*b*** Differential output shaft
A First shifting element
AK1 Actuator
AK2 Actuator
AW Transmission output shaft
a1 Wheel axle, left
a2 Wheel axle, right
a3 Wheel axle
a4 Wheel axle
B Second shifting element
C Third shifting element
D First coupling element.
DI Axle differential
DIK Differential cage
DU Access point
E Second coupling element
EM1 First electric machine
EM2 Second electric machine
EW Transmission input shaft
G2 Two-gear transmission
G3 Three-gear transmission
HR1 First ring gear shaft
HR2 Second ring gear shaft
HR3 Third ring gear shaft
KE Coupling mechanism
KT1 Bevel gear drive
KT2 Crown wheel
m Rotation axis (EM1, EM2)
PS1 First planetary gearset
PS2 Second planetary gearset
PS**3*a*** Third planetary gearset, right
PS**3*b*** Third planetary gearset, left
PS**4*a*** Fourth planetary gearset, right
PS**4*b*** Fourth planetary gearset, left
R1 Drive wheel, left
R2 Drive wheel, right
R3 Drive wheel
R4 Drive wheel
RO1 Rotor (EM)
RO2 Rotor (EM2)
SE2 Shifting mechanism (G2)
S3 Shifting mechanism (G3)
SM Sliding sleeve
SO1 First sun shaft (PS1)
SO2 Second sun shaft (PS2)
SO3 Third sun shaft (PS3)
ST1 First web shaft (PS1)
ST2 Second web shaft (PS2)
ST3 Third web shaft (PS3)
STa Spur gear stationary transmission, left
ST6 Spur gear stationary transmission, right
u Axle offset
v Axle offset
Z1 Drive input gearwheel
Z2 Drive output gearwheel
Z3 Intermediate wheel
Z4 Intermediate wheel

The invention claimed is:

1. A drive axle of an electric vehicle, the drive axle comprising:

a first drive wheel and a second drive wheel;

a first wheel axle and a second wheel axle;

a first electric machine and a second electric machine with a common rotation axis;

a change-speed transmission with a transmission input shaft and a transmission output shaft, wherein the transmission is in the form of a three-gear transmission with a first shifting element, a second shifting element, a third shifting element, and first and second planetary gearsets coupled with one another;

an axle differential with a differential input and two differential output shafts, wherein the first electric machine is connected to the transmission input shaft and the transmission output shaft is connected to the differential input, and wherein the second electric machine is configured to be connected as an additional drive;

wherein the first planetary gearset comprises a first sun shaft, a first ring gear shaft and a first web shaft and the second planetary gearset comprises a second sun shaft, a second ring gear shaft and a second web shaft;

wherein the first web shaft is connected fast to the second ring gear shaft;

wherein the first sun shaft forms the transmission input shaft;

wherein the first ring gear shaft is held fixed;

wherein the second web shaft forms the transmission output shaft; and wherein, actuating the first shifting element engages the first gear, actuating the second shifting element engages the second gear, and actuating the third shifting element engages the third gear.

2. The drive axle according to claim 1, wherein by means of the first shifting element the second sun shaft can be coupled to a housing of the change-speed transmission, and wherein by means of the third shifting element the second sun shaft can be coupled to the first sun shaft.

3. The drive axle according to claim 1, wherein by means of the second shifting element the second planetary gearset is blocked, since respectively two of the three shafts are connected to one another.

4. The drive axle according to claim 1, further comprising a sliding sleeve, wherein the first shifting element, the second shifting element, and the third shifting element are integrated in the sliding sleeve and the sliding sleeve is arranged and configured to be displaced on the second sun shaft.

5. The drive axle according to claim 4, further comprising an actuator, wherein the sliding sleeve is configured to be actuated by the actuator.

6. The drive axle according to claim 5, further comprising a coupling mechanism having two coupling positions, wherein the second electric machine can be connected by means of the coupling mechanism.

7. The drive axle according to claim 6, wherein in a first coupling position the second electric machine is configured to be coupled with the transmission input shaft, and wherein in a second coupling position the second electric machine is configured to be coupled to the second sun shaft.

8. The drive axle according to claim 7, wherein the coupling mechanism has a neutral position in which the second electric machine can be decoupled.

9. The drive axle according to claim 6, wherein the sliding sleeve has an access point through which a connection to the coupling mechanism can be made.

10. The drive axle according to claim 1, wherein the first wheel axle of the first drive wheel and the second wheel axle of the second drive wheel are arranged coaxially or axis-parallel with the common rotation axis of the first electric machine and the second electric machine.

11. A drive axle of an electric vehicle, the drive axle comprising:

a first drive wheel and a second drive wheel;

a first wheel axle and a second wheel axle;

a first electric machine and a second electric machine with a common rotation axis;

a change-speed transmission with a transmission input shaft and a transmission output shaft, wherein the change-speed transmission is in the form of a two-gear transmission with a first shifting element, a third shifting element and first and second planetary gearsets coupled to one another;

an axle differential with a differential input and two differential output shafts;

wherein the first electric machine is connected to the transmission input shaft and the transmission output shaft is connected to the differential input;

wherein the second electric machine is configured to be connected as an additional drive;

wherein the first planetary gearset comprises a first sun shaft, a first ring gear shaft, and a first web shaft;

wherein the second planetary gearset comprises a second sun shaft, a second ring gear shaft and a second web shaft;

wherein the first web shaft is connected fast to the second ring gear shaft;

wherein the first sun shaft forms the transmission input shaft;

wherein the first ring gear shaft is held fixed;

wherein the second web shaft forms the transmission output shaft; and wherein actuating the first shifting element engages the first gear and, actuating the third shifting element engages the second gear.

12. The drive axle according to claim 11, wherein by means of the first shifting element the second sun shaft can be coupled to a housing of the change-speed transmission.

13. The drive axle according to claim 12, wherein by means of the third shifting element the second sun shaft can be coupled to the first sun shaft.

14. The drive axle according to claim 13, wherein the first shifting element and the third shifting element are in the form of unsynchronized claw-type shifting elements.

15. The drive axle according to claim 14, wherein the change-speed transmission has one or more neutral positions in which the first electric machine can be decoupled.

16. A drive axle of an electric vehicle, the drive axle comprising:

a first drive wheel and a second drive wheel;

a first wheel axle and a second wheel axle;

a first electric machine and a second electric machine arranged with a common rotation axis;

a change-speed transmission with a transmission input shaft and a transmission output shaft;

an axle differential with a differential input and two differential output shafts; and fixed gear ratio steps arranged between the two differential output shafts and the first and second drive wheels;

wherein the first electric machine is connected to the transmission input shaft, the transmission output shaft is connected to the differential input, and the second electric machine is configured to be connected as an additional drive; and wherein the drive axle is in the form of a portal axle, such that each of the two differential output shafts has an axle offset relative to the first wheel axle and to the second wheel axle, respectively.

17. The drive axle according to claim 16, wherein the fixed gear ratio steps are in the form of a third planetary gearset having a ring gear shaft held fixed.

18. The drive axle according to claim 16, wherein the fixed gear ratio step is in the form of a fourth planetary gearset having a web held fixed.

19. The drive axle according to claim 16, wherein the fixed gear ratio steps are in the form of a spur gear stationary transmission having a drive input gearwheel, a drive output gearwheel, and two intermediate wheels.

* * * * *